(12) United States Patent
Kim et al.

(10) Patent No.: US 12,113,923 B2
(45) Date of Patent: Oct. 8, 2024

(54) REAR GLASS TOUCH SENSOR

(71) Applicant: DONGWOO FINE-CHEM CO., LTD., Iksan-si (KR)

(72) Inventors: Jongmin Kim, Pyeongtaek-si (KR); Dong Pil Park, Yeonsu-gu (KR); Jaehyun Lee, Uiwang-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 24 days.

(21) Appl. No.: 17/419,872

(22) PCT Filed: Dec. 26, 2019

(86) PCT No.: PCT/KR2019/018495
§ 371 (c)(1),
(2) Date: Jun. 30, 2021

(87) PCT Pub. No.: WO2020/141801
PCT Pub. Date: Jul. 9, 2020

(65) Prior Publication Data
US 2022/0091688 A1   Mar. 24, 2022

(30) Foreign Application Priority Data

Jan. 3, 2019 (KR) .................... 10-2019-0000692

(51) Int. Cl.
*H04M 1/02* (2006.01)
*G06F 3/044* (2006.01)
*G06V 40/13* (2022.01)

(52) U.S. Cl.
CPC .......... *H04M 1/0283* (2013.01); *G06F 3/044* (2013.01); *G06V 40/1306* (2022.01); *H04M 1/0277* (2013.01); *H04M 2250/22* (2013.01)

(58) Field of Classification Search
CPC ............. H04M 1/0277; H04M 1/0283; H04M 2250/22; G06F 3/044; G06V 40/1306

USPC .................................................. 345/173–174
See application file for complete search history.

(56) References Cited

U.S. PATENT DOCUMENTS

| | | | |
|---|---|---|---|
| 9,122,088 B2 | 9/2015 | Omote et al. | |
| 2016/0202805 A1* | 7/2016 | Ichiki | G06F 3/0445 |
| | | | 345/174 |
| 2017/0048990 A1* | 2/2017 | Sim | G06F 1/1656 |
| 2017/0220182 A1* | 8/2017 | Schwartz | G06F 3/0412 |
| 2017/0372110 A1* | 12/2017 | Uehara | G06F 3/041 |

(Continued)

FOREIGN PATENT DOCUMENTS

| | | | | |
|---|---|---|---|---|
| CN | 108291818 A | * | 7/2018 | G06K 9/0002 |
| KR | 10-2011-0104349 A | | 9/2011 | |

(Continued)

OTHER PUBLICATIONS

International Searching Authority, International Search Report of PCT/KR2019/018495 dated Apr. 28, 2020 [PCT/ISA/210].

*Primary Examiner* — Kwin Xie
(74) *Attorney, Agent, or Firm* — Sughrue Mion, PLLC

(57) ABSTRACT

A touch sensor includes a sensing cell part having a plurality of sensing cells, a wiring part having a plurality of wires for transmitting a sensing signal of the sensing cell part, and a pad electrode part having a plurality of pad electrodes for transmitting the sensing signal received from the wiring part to an flexible printed circuits board (FPCB), and is coupled to a rear glass of a portable terminal.

16 Claims, 5 Drawing Sheets

(56) References Cited

U.S. PATENT DOCUMENTS

2017/0372115 A1* 12/2017 Lee .................... G06V 40/12
2018/0211078 A1*  7/2018 Lillie ................ G06V 40/1306
2018/0350883 A1* 12/2018 Lee .................... H10K 59/879
2019/0339784 A1* 11/2019 Lemay ................ G06F 1/3206

FOREIGN PATENT DOCUMENTS

| KR | 10-2011-0138743 A | 12/2011 |
| KR | 10-1432988 B1 | 8/2014 |
| KR | 10-2015-0023995 A | 3/2015 |
| KR | 10-2016-0122514 A | 10/2016 |
| KR | 10-2017-0131102 A | 11/2017 |
| KR | 10-2017-0136061 A | 12/2017 |

* cited by examiner

【Figure 1】
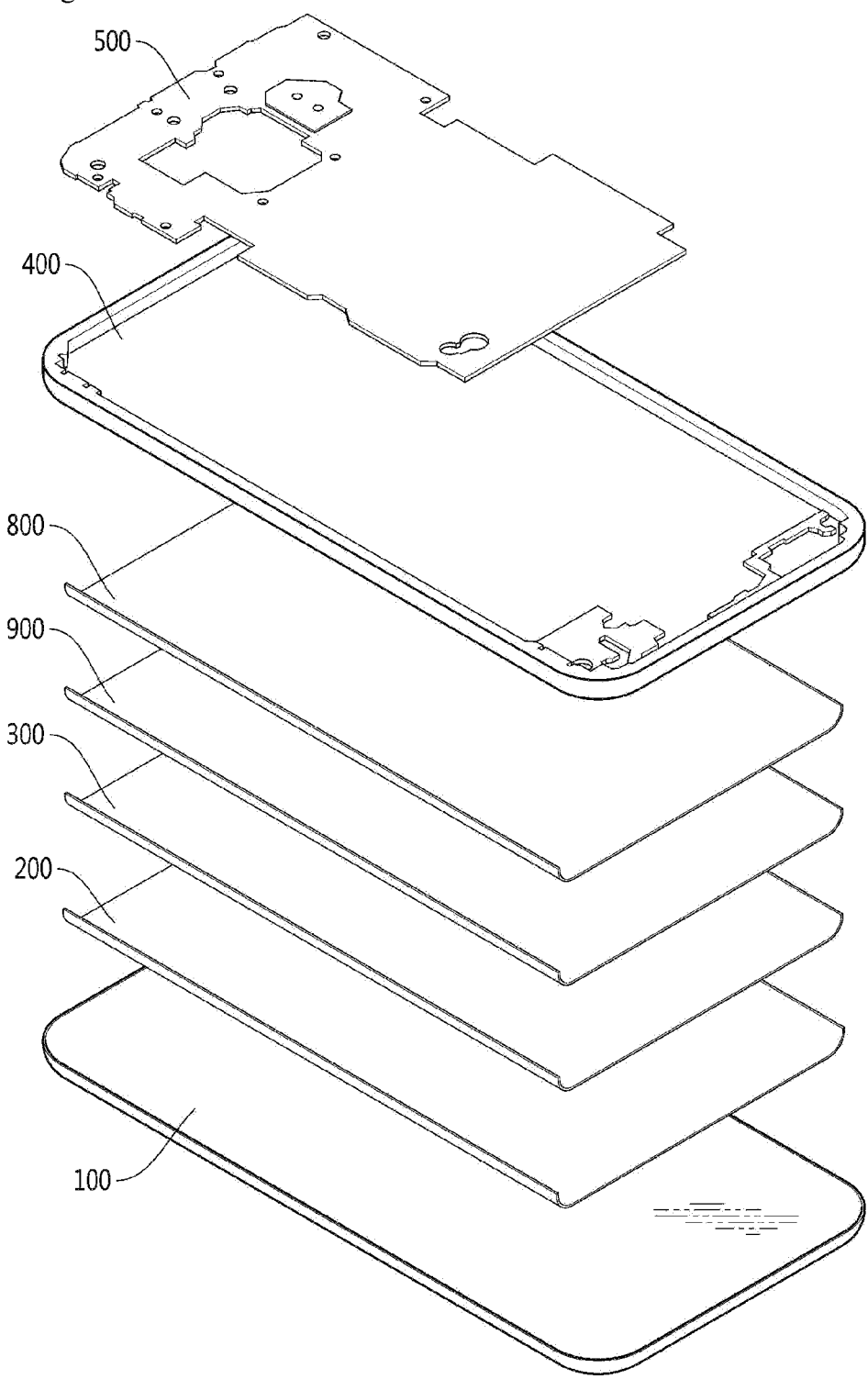

【Figure 2】
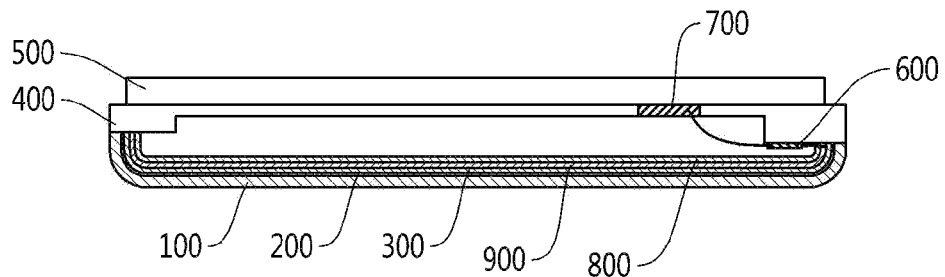
【Figure 3】
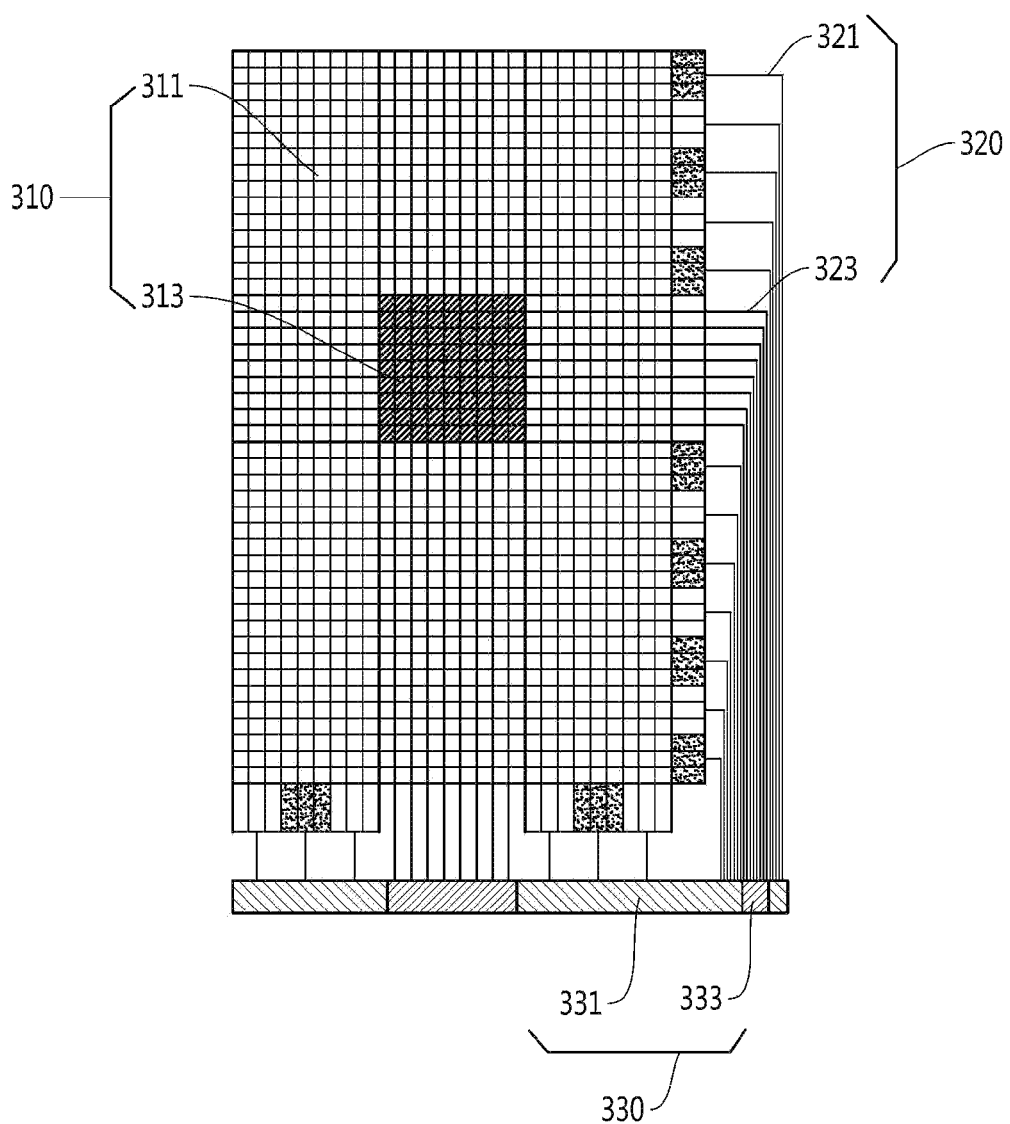

[Figure 4]
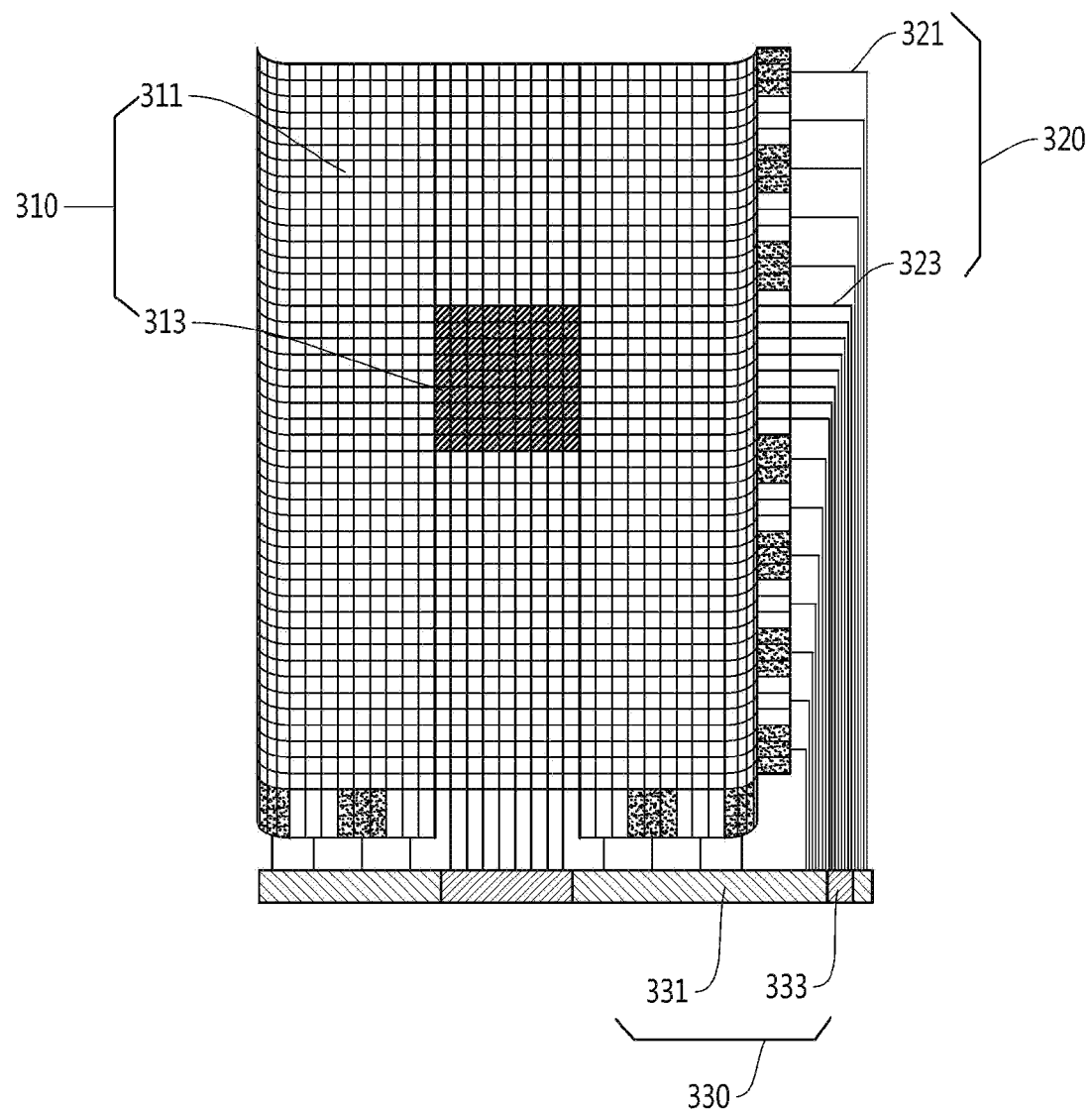

[Figure 5]
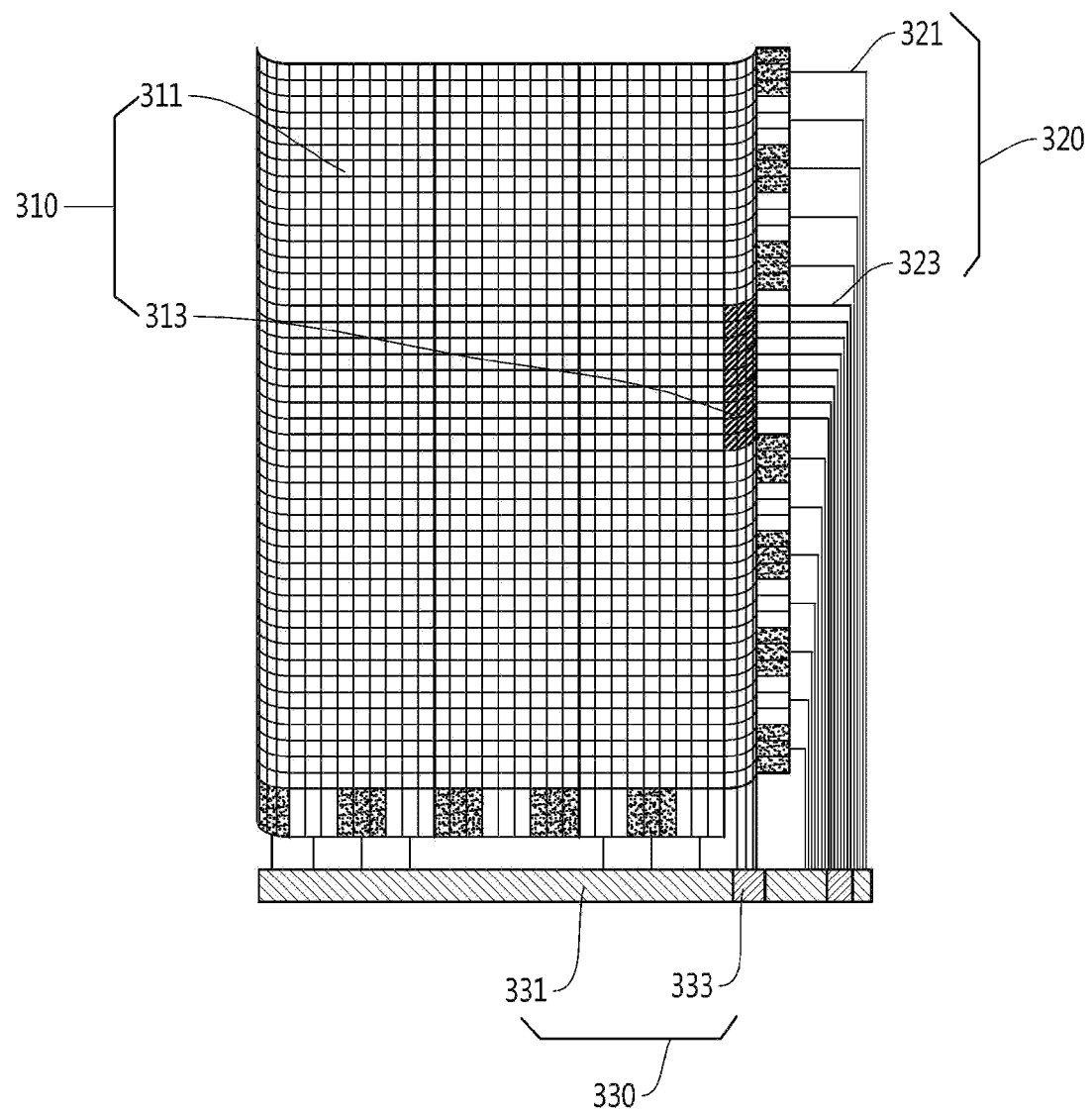

[Figure 6]
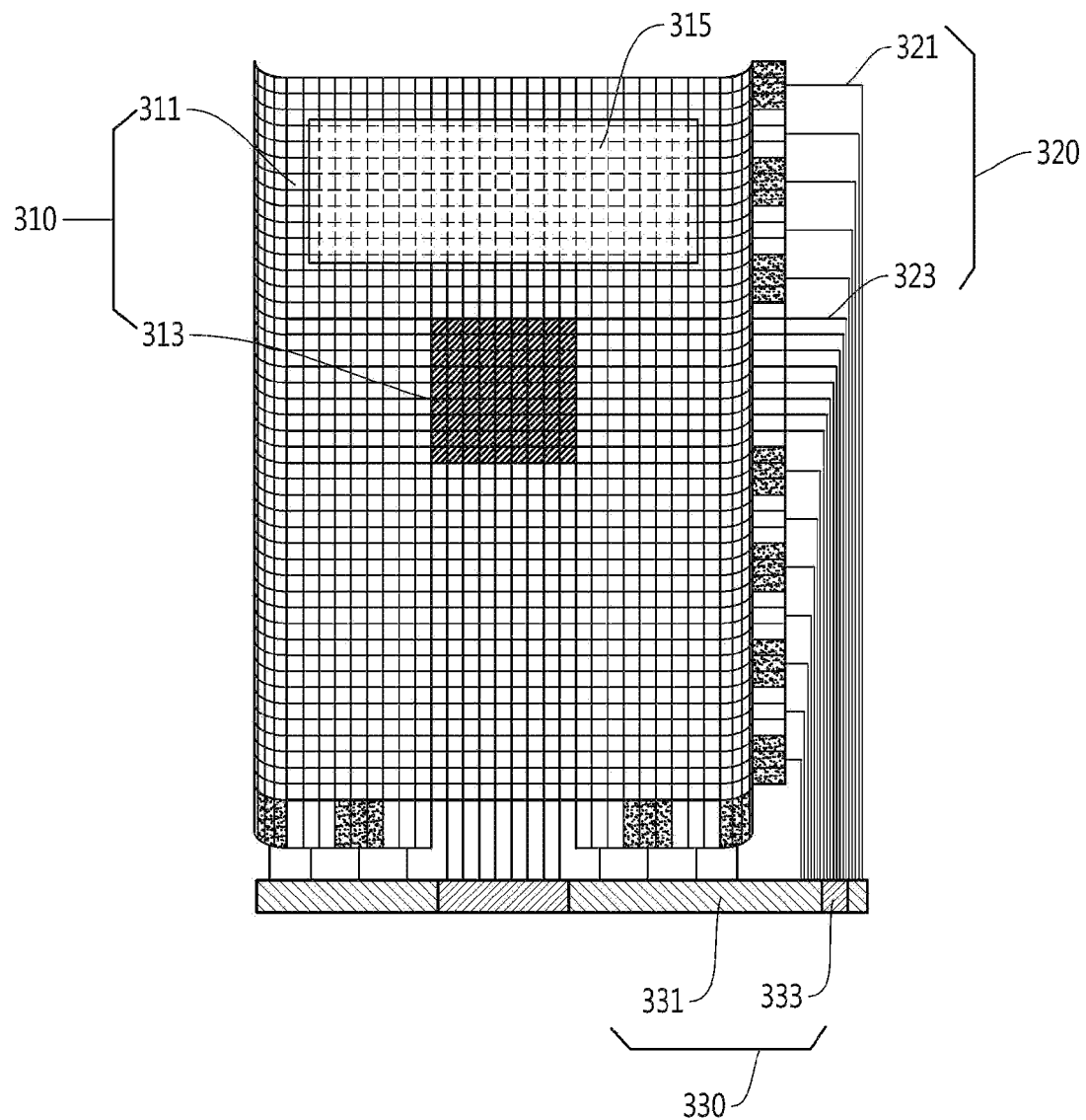

REAR GLASS TOUCH SENSOR

CROSS REFERENCE TO RELATED APPLICATIONS

This is a National Stage of International Application No. PCT/KR2019/018495 filed Dec. 26, 2019, claiming priority based on Korean Patent Application No. 10-2019-0000692 filed Jan. 3, 2019, the contents of all of which are incorporated herein by reference in their entirety.

TECHNICAL FIELD

The present invention relates to a touch sensor. Specifically, the present invention relates to a touch sensor coupled to a rear glass of a portable terminal.

BACKGROUND ART

A touch sensor of a smartphone or the like is an input device that receives a command by a touch. There are a resistive type, a capacitive type, an ultrasonic type, an infrared type, and so on, according to the sensing method of a touch part. Recently, the capacitive type is mainly used.

The capacitive type uses a transparent substrate on which a conductive thin film is formed. When a user touches a surface of a coated transparent substrate with a certain amount of current flowing through the surface of the transparent substrate, the amount of current changes at the contact surface. The capacitive type can detect such a change in current to detect whether or not it is touched.

Korean Patent Publication No. 2017-0136061 discloses a display device having a sensor screen. According to the contents, in order to solve the inherent problem of the capacitive method, which decreases the fingerprint recognition rate when the capacitance decreases as the distance between a fingerprint and a sensor increases, a fingerprint sensor is placed between two transparent substrates, that is, on a location having a smaller thickness than a single transparent substrate to increase the fingerprint recognition rate.

Though Korean Patent Publication No. 2017-0136061 minimizes the decrease in fingerprint recognition rate by placing the fingerprint sensor in the area of a small thickness, problems can still arise in securing visibility and fingerprint recognition due to a front cover glass and polarizing plate, which are essential components of a front panel having a polarizing plate. That is, when the fingerprint sensor is located above the polarizing plate, visibility may be deteriorated, and when the fingerprint sensor is located under the polarizing plate, the fingerprint recognition rate may decrease due to an increase in thickness.

DISCLOSURE OF INVENTION

Technical Problem

The present invention is to solve the above problems of the prior art and intends to provide a touch sensor capable of fundamentally solving the problem of visibility and electrode resistance on a front panel, greatly increasing the fingerprint recognition rate of a fingerprint sensor, and expanding function key area widely.

Technical Solution

A touch sensor of the present invention to achieve this object may include a sensing cell part having a plurality of sensing cells, a wiring part having a plurality of wires for transmitting a sensing signal of the sensing cell part, and a pad electrode part having a plurality of pad electrodes for transmitting the sensing signal received from the wiring part to an flexible printed circuit board (FPCB), and may be coupled to a rear glass of a portable terminal.

In the touch sensor of the present invention, the sensing cell part may include a high resolution touch area for a fingerprint touch.

In the touch sensor of the present invention, the sensing cell part may include a low resolution touch area for a touch other than the fingerprint touch.

In the touch sensor of the present invention, the sensing cell part may include a dummy area.

In the touch sensor of the present invention, the rear glass may have a curved extension part formed extending from the rear to the side of the portable terminal, and the sensing cell part may include a curved sensing cell part coupled to the curved extension part of the rear glass.

In the touch sensor of the present invention, the sensing cell part may include a curved sensing cell part coupled to the curved extension part extended in a curved shape on a side of the rear glass.

In the touch sensor of the present invention, the curved sensing cell part may include at least one of the high resolution touch area and the low resolution touch area.

In the touch sensor of the present invention, the sensing cell part may be formed of a conductive metal.

In the touch sensor of the present invention, the low resolution touch area of the sensing cell part may detect at least one signal of volume control and power on/off.

A portable terminal, which is another aspect of the present invention, may be configured to include a rear glass, a decorative film layer, a touch sensor, an FPCB, a connection part, and so on.

The rear glass may be coupled to the rear of the portable terminal.

The decorative film layer may be coupled to the rear glass.

The touch sensor may be coupled to the decorative film layer. The touch sensor may include a sensing cell part having a plurality of sensing cells, a wiring part having a plurality of wires for transmitting a sensing signal of the sensing cell part, and a pad electrode part having a plurality of pad electrodes for transmitting the sensing signal received from the wiring part to the FPCB.

The FPCB may be coupled to the pad electrode part of the touch sensor.

The connection part may have one side connected to the FPCB and the other side penetrating or bypassing a rear case of the portable terminal to connect to a PCB of the portable terminal.

In the portable terminal of the present invention, the touch sensor may be formed on the decorative film layer with a transfer method.

The portable terminal of the present invention may include an adhesive layer between the decorative film layer and the touch sensor.

The portable terminal of the present invention may include a signal interference blocking layer between the touch sensor and a main PCB or a battery. The signal interference blocking layer may be formed of a conductive metal having a sheet resistance of 0.1 Ω/sq or less.

The portable terminal of the present invention may include a cushion tape between the touch sensor and the signal interference blocking layer.

In the portable terminal of the present invention, the sensing cell part may be formed of a conductive metal.

In the portable terminal of the present invention, a thickness including the rear glass and the decorative film may be 100 to 500 μm.

The portable terminal of the present invention may include an adhesive layer between the decorative film layer and the touch sensor.

Advantageous Effects

According to the touch sensor of the present invention having such a configuration, the problem of visibility of a front panel can be fundamentally solved by placing a fingerprint sensor on a rear panel rather than the front panel.

When the fingerprint sensor is placed on the front panel, it is necessary to configure sensing electrodes of sensing cells with a conductive transparent oxide film or minimize the use of conductive metal in order to secure visibility. However, if the touch sensor is provided on a rear glass, since there is no need to worry about deterioration of visibility, a conductive metal having good conductivity can be freely used as the sensing electrodes of the sensing cells, and as a result, the touch sensitivity of the sensing cell can be greatly increased.

In addition, according to the touch sensor of the present invention, a curved sensing cell is provided in a curved extension part on the side of the rear glass, so that a function key sensing area such as power on/off and volume control or a fingerprint touch area can be additionally disposed, which increases the space utilization.

DESCRIPTION OF DRAWINGS

FIG. 1 is a partial perspective view of a portable terminal having a touch sensor according to the present invention.

FIG. 2 is a partial cross-sectional view of a portable terminal having a touch sensor according to the present invention.

FIG. 3 illustrates the first embodiment of a touch sensor according to the present invention.

FIG. 4 illustrates the second embodiment of a touch sensor according to the present invention.

FIG. 5 illustrates the third embodiment of a touch sensor according to the present invention.

FIG. 6 illustrates the fourth embodiment of a touch sensor according to the present invention.

BEST MODE

Hereinafter, the present invention will be described in detail with reference to the accompanying drawings.

FIG. 1 is a partial perspective view of a portable terminal having a touch sensor according to the present invention, and FIG. 2 is a partial cross-sectional view of a portable terminal having a touch sensor according to the present invention.

As shown in FIG. 1, the portable terminal having the touch sensor according to the present invention may be configured to include a rear glass 100, a decorative film layer 200, a touch sensor 300, a rear case 400, a main PCB 500, and so on.

The rear glass 100 may be coupled to the rear of the portable terminal. The rear glass 100 is a rear cover window of the portable terminal, and may be configured in a flat shape as a whole, or a shape having a curved extension part at an edge with a flat central part.

The rear glass 100 may be made of tempered glass, and in addition, polyethersulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC) and cellulose acetate propionate (CAP) are also possible. In the present invention, the term 'glass' is used in a broad sense not only to refer to glass, but to refer to a material having high transmittance.

The decorative film layer 200 may be bonded to the rear glass. As the decorative film layer 200, a film type including a hard coating layer, a decorative layer, an acrylic coating layer, etc. may be used, or only the decorative layer may be formed on the rear glass 100 by a method such as deposition or printing. In the present invention, the decorative film layer 200 is used in a sense including all of a film form, a printed form, and the like.

The hard coating layer is a base film and may be a cured layer of polyurethane terephthalate, acrylic polymer, urethane acrylate monomer, urethane acrylate oligomer, or the like. The hard coating layer may have a thickness of 1 to 30 μm.

The decorative layer controls transmittance or reflectance, and plays a role of implementing color. The decorative layer may be formed by a deposition process. As the decorative layer, metals such as indium, chromium, and tin, and mixtures thereof may be used. The decorative layer may have a thickness of 100 nm to 1 μm.

The acrylic coating layer may have resistance to pressure, temperature, etc. applied when the decorative film layer 200 is attached to the rear glass 100.

The touch sensor 300 may be coupled to the decorative film layer 200. The touch sensor 300 may be in the form of a film attached to the decorative film layer 200 through an adhesive layer such as a PSA, or may be configured on the decorative film layer 200 with a transfer method.

The rear glass 100 and the decorative film layer 200 described above may have a total thickness in the range of 100 to 500 μm. When an adhesive layer, etc. is formed between the decorative film layer 200 and the touch sensor 300, the entire thickness including the adhesive layer, etc. can be configured in the range of 100 to 500 μm. When the total thickness exceeds 500 μm, it is difficult to secure mutual capacitance for high-resolution sensing in the capacitance method. On the other hand, when the minimum thickness, that is, the thickness of the rear glass 100 is smaller than 100 μm, correct capacitance change may not occur. Between the fingerprint and the sensing cell on the touch surface must occur charge discharge to detect a touch. However, if the thickness is less than 100 μm, it is not discharged but charged, and a ghost phenomenon in which the touch is recognized in an unwanted place may occur.

The touch sensor 300 may include a sensing cell part, a wiring part, a pad electrode part, and so on.

The sensing cell part may include a plurality of sensing cells to sense a touch occurring on the surface of the rear glass 100.

The wiring part transmits a sensing signal of the sensing cell part to the pad electrode part, and may include a plurality of wires.

The pad electrode part transmits the sensing signal received from the wiring part to an FPCB, and may include a plurality of pad electrodes.

The rear case 400 protects the portable terminal from external impact, and may be opened forward and backward to surround edges of the portable terminal. The rear case 400 may be configured as an integral type, or may be configured as a plurality of bumper frames and combined at the front and rear of the rim of the portable terminal. The bumper frames may be coupled by fitting coupling protrusions and coupling grooves. The rear case 400 may typically be made of a metal material, or silicone, plastic, or the like may also be used.

The main PCB 500 may include a socket for inserting and mounting a memory card, an interface connector, a battery terminal, and the like. The main PCB 500 may supply power to the touch sensor 300 through an FPCB 600, and transmit and receive signals with the touch sensor 300 through the FPCB 600.

As shown in FIG. 1, the portable terminal may further include a signal interference blocking layer 800 between the touch sensor 300 and the main PCB 500 or the battery. The signal interference blocking layer 800 may be formed of a conductive metal having a sheet resistance of 0.1 Ω/sq or less.

In addition, a cushion tape 900 may be further stacked between the touch sensor 300 and the signal interference blocking layer 800. The cushion tape 900 may reduce physical pressure applied to the touch sensor 300.

As shown in the cross-sectional view of FIG. 2, the portable terminal having the touch sensor according to the present invention may include the FPCB 600, a connection part 700, and the like.

One side of the FPCB 600 may be connected to the touch sensor 300 to directly process a sensing signal or transmit it to the main PCB 500. The FPCB 600 may receive power and driving signals from the main PCB 500 and transmit them to the touch sensor 300. The FPCB 600 may be coupled to the rear case 400 or the like.

The FPCB 600 may be adhered to the pad electrode part of the touch sensor 300 using an adhesive including a photocurable resin. As the adhesive, an anisotropic conductive film (ACF) having a plurality of conductive balls may be used.

One side of the connection part 700 may be connected to the FPCB 600 and the other side may be connected to the main PCB 500. The connection part 700 may be configured to penetrate or bypass the rear case 400.

The connection part 700 may be made of a conductive metal, and, for example, silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), or an alloy thereof (e.g., silver-palladium-copper (APC)) may be used.

FIG. 3 illustrates the first embodiment of a touch sensor according to the present invention.

As shown in FIG. 3, the touch sensor 300 may include a sensing cell part 310, a wiring part 320, a pad electrode part 330, and so on.

The sensing cell part 310 may include a plurality of sensing cells. A first sensing electrode is formed by connecting a plurality of sensing cells arranged in a horizontal (X-axis) direction and a second sensing electrode is formed by connecting a plurality of sensing cells arranged in a vertical (Y-axis) direction on a transparent substrate. A plurality of first and second sensing electrodes may be arranged in a horizontal or vertical direction. The sensing cell can be configured in the form of an island, and the sensing cells may be electrically connected through a conductive bridge.

The sensing cell part 310 may be composed of a general touch area 311 and a fingerprint touch area 313. The general touch area 311 and the fingerprint touch area 313 may be used to implement a low resolution and a high resolution, respectively. In the general touch area 311, a plurality of sensing electrodes may be bundled and connected to a single touch signal wire 321, and, in the fingerprint touch area 313, the sensing electrodes may respectively be connected to fingerprint signal wires 323.

FIG. 3 shows that the fingerprint touch area 313 is formed in a part of the sensing cell part 310. However, when the rear glass 100 is mainly used for fingerprint recognition, the entire sensing cell part 310 or the entire horizontal area in a certain vertical area may be configured as the fingerprint touch area 313. When the rear glass 100 is mainly used for general touch recognition, the fingerprint touch area 313 may be configured in a corner area of the sensing cell part 310.

In the sensing cell part 310, since there is no problem of deterioration in visibility in both the general touch area 311 and the fingerprint touch area 313, the sensing electrode may be formed of a conductive metal. As the conductive metal, silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), or alloys thereof (e.g., silver-palladium-copper (APC)) can be used.

In the fingerprint touch area 313, a pitch between sensing cells may be 100 μm or less in consideration of the interval of the fingerprint ridges (usually 50 to 200 μm), and 70 μm or less for precise sensing.

In the sensing cell part 310, the sensing electrode in the general touch area 313 may also be formed of a conductive metal as described above, but in the area requiring visibility, a transparent conductive material such as ITO (indium tin oxide), PEDOT:PSS, silver-nanowire (AgNW), or the like can be used as the sensing electrode.

The wiring part 320 transmits a sensing signal of the sensing cell part 310 to the pad electrode part 330 and may include a plurality of wires. The wiring part 320 may include a touch signal wire 321 connected to the sensing electrode of the general touch area 311 and a fingerprint signal wire 323 connected to the sensing electrode of the fingerprint touch area 313. The wiring part 320 may be disposed in a peripheral area of the sensing cell part 310. The wiring part 320 may be disposed on one side or separately disposed on both sides.

The pad electrode part 330 transmits a sensing signal received from the wiring part 320 to the FPCB 600, and it may include a plurality of pad electrodes. The pad electrode part 330 may be divided into a touch signal pad electrode part 331 for receiving a sensing signal of the general touch area 311 and a fingerprint signal pad electrode part 333 for receiving a sensing signal of the fingerprint touch area 313. In the fingerprint signal pad electrode part 333, pad electrodes may be arranged with high density due to the high resolution of the fingerprint touch area 313.

As shown in FIG. 3, the touch sensor of the first embodiment may configure the sensing cell part 310 in a planar shape.

A rear glass 100 may have a flat part, and may optionally have a curved extension part at an edge.

A decorative film layer 200 may be bonded to the flat part of the rear glass 100, and may optionally be bonded to the curved extension part of the rear glass 100.

The sensing cell part 310 may be coupled to a flat part of the decorative film layer 200 to detect a touch input on the flat part of the rear glass 100.

FIG. 4 illustrates the second embodiment of a touch sensor according to the present invention.

As shown in FIG. 4, the touch sensor of the second embodiment may include a sensing cell part 310 with a flat part and a curved part.

A rear glass 100 may include a flat part in a central area and a curved part at an edge, particularly on left and right sides.

A decorative film layer 200 may be coupled to the flat part and the curved part of the rear glass 100.

The sensing cell part 310 may be coupled to a flat part and a curved part of the decorative film layer 200 to detect a touch input in both the flat part and the curved part of the rear glass 100.

The sensing cell part 310 may include a general touch area 311 and a fingerprint touch area 313. The sensing cell part 310 may configure the left and right curved parts as the general touch area 311. The fingerprint touch area 313 may be disposed in the entire sensing cell part 310, in the entire horizontal area in a certain vertical area, or in a corner area of the flat part.

In the sensing cell part 310, the sensing electrode may be formed of a conductive metal in the entire flat part and the curved part, and when visibility is required, the corresponding area may be formed of a transparent conductive material.

In the second embodiment of FIG. 4, the curved part of the rear glass 100 displays function keys for controlling volume adjustment and power on/off, and the curved part of the sensing cell part 310 may detect touch inputs such as volume control, power on/off, etc.

FIG. 5 illustrates the third embodiment of a touch sensor according to the present invention.

As shown in FIG. 5, the touch sensor of the third embodiment may include a sensing cell part 310 with a flat part and a curved part.

A rear glass 100 may include a flat part in a central area and a curved part at an edge, particularly on left and right sides. A decorative film layer 200 may be coupled to the flat part and the curved part of the rear glass 100.

The sensing cell part 310 may be coupled to a flat part and a curved part of the decorative film layer 200 to detect a touch input in both the flat part and the curved part of the rear glass 100.

In the sensing cell part 310, a general touch area 311 may be disposed on the flat part, and the general touch area 311 and a fingerprint touch area 313 may be disposed together on the curved part.

In the sensing cell part 310, the sensing electrode may be formed of a conductive metal in the entire flat part and the curved part, and when visibility is required, the corresponding area may be formed of a transparent conductive material.

The curved part of the rear glass 100 may display function keys for controlling volume adjustment and power on/off, and the curved part of the sensing cell part 310 may detect touch inputs such as volume control, power on/off, etc.

The curved part of the rear glass 100 may display a fingerprint recognition window, and the curved part of the sensing cell part 310 may sense a fingerprint input.

In the third embodiment of FIG. 5, the general touch area 311 and the fingerprint touch area 313 are mixedly configured on the curved part of the sensing cell part 310, however, the entire curved part may be configured to be the fingerprint touch area 313.

FIG. 6 illustrates the fourth embodiment of a touch sensor according to the present invention.

As shown in FIG. 6, the touch sensor of the fourth embodiment may include a sensing cell part 310 with a flat part and a curved part.

A rear glass 100 may include a flat part and a curved part, and a decorative film layer 200 may be coupled to the flat part and the curved part of the rear glass 100.

The sensing cell part 310 may be coupled to a flat part and a curved part of the decorative film layer 200 to detect a touch input in the flat part and the curved part of the rear glass 100.

The sensing cell part 310 may include a general touch area 311, a fingerprint touch area 313, and a dummy area 315.

The dummy area 315 may be located in a device area including a camera or the like. The dummy area 315 is for preventing visibility deterioration, and may be formed of a conductive metal or a transparent conductive material, similarly to the sensing cell part 310.

The preferred embodiments of the present invention have been described with reference to the drawings. However, the present invention is not limited to the above-described embodiment, and it will be understood that the present invention can be implemented in a modified form without departing from the essential characteristics of the present invention. Therefore, the scope of the present invention is defined by the claims rather than the foregoing description, and all differences within the equivalent range should be interpreted as being included in the present invention.

| [Description of reference numerals] |
| --- |
| 100: rear glass |
| 200: decorative film layer |
| 300: touch sensor |
| 310: sensing cell part |
| 311: general touch area |
| 313: fingerprint touch area |
| 320: wiring part |
| 321: touch signal wire |
| 323: fingerprint signal wire |
| 330: pad electrode part |
| 331: touch signal pad electrode part |
| 333: fingerprint signal pad electrode part |
| 400: rear case |
| 500: main PCB |
| 600: FPCB |
| 700: connection part |
| 800: signal interference blocking layer |
| 900: cushion tape |

The invention claimed is:

1. A touch sensor comprising:
   a sensing cell part having a general touch area and a dummy area located in a device area including a camera within the general touch area, wherein the dummy area is formed of a same material as the general touch area;
   a wiring part having a plurality of wires for transmitting a sensing signal of the sensing cell part; and
   a pad electrode part having a plurality of pad electrodes for transmitting the sensing signal received from the wiring part to an FPCB (flexible printed circuit board),
   wherein the touch sensor is coupled to a rear glass of a portable terminal and the rear glass is a rear-most layer of the portable terminal with no element beneath.

2. The touch sensor according to claim 1, wherein the sensing cell part includes a high resolution touch area for a fingerprint touch, a low resolution touch area for a touch other than the fingerprint touch, or both.

3. The touch sensor according to claim 2, wherein the sensing cell part is formed of a conductive metal.

4. The touch sensor according to claim 2, wherein the sensing cell part includes a curved sensing cell part coupled to a curved extension part extended in a curved shape on a side of the rear glass, and the curved sensing cell part includes the high resolution touch area, the low resolution touch area, or both.

5. The touch sensor according to claim 4, wherein the low resolution touch area of the curved sensing cell part detects signal of volume control, power on/off, or both.

6. A portable terminal comprising:

a rear glass that is a rear-most layer of the portable terminal with no element beneath;

a decorative film layer coupled to the rear glass;

a touch sensor coupled to the decorative film layer and including a sensing cell part having a general touch area and a dummy area located in a device area including a camera within the general touch area, wherein the dummy area is formed of the same material as the general touch area, a wiring part having a plurality of wires for transmitting a sensing signal of the sensing cell part, and a pad electrode part having a plurality of pad electrodes for transmitting the sensing signal received from the wiring part to an FPCB (flexible printed circuit board);

the FPCB coupled to the pad electrode part of the touch sensor; and a connection part having one side connected to the FPCB and the other side penetrating or bypassing a rear case of the portable terminal to connect to a PCB (printed circuit board) of the portable terminal.

7. The portable terminal according to claim 6, wherein the touch sensor is formed on the decorative film layer with a transfer method.

8. The portable terminal according to claim 6, further comprising an adhesive layer between the decorative film layer and the touch sensor.

9. The portable terminal according to claim 6, further comprising a signal interference blocking layer between the touch sensor and a main PCB (printed circuit board) or a battery.

10. The portable terminal according to claim 9, wherein the signal interference blocking layer is formed of a conductive metal having a sheet resistance of 0.1 Ω/sq or less.

11. The portable terminal according to claim 9, further comprising a cushion tape between the touch sensor and the signal interference blocking layer.

12. The portable terminal according to claim 6, wherein the sensing cell part is formed of a conductive metal.

13. The portable terminal according to claim 6, wherein a thickness including the rear glass and the decorative film is 100 to 500 μm.

14. The portable terminal according to claim 13, further comprising an adhesive layer between the decorative film layer and the touch sensor.

15. The touch sensor according to claim 3, wherein the sensing cell part includes a curved sensing cell part coupled to a curved extension part extended in a curved shape on a side of the rear glass, and the curved sensing cell part includes the high resolution touch area, the low resolution touch area, or both.

16. The touch sensor according to claim 15, wherein the low resolution touch area of the curved sensing cell part detects signal of volume control, power on/off, or both.

* * * * *